United States Patent
Chen et al.

(10) Patent No.: US 9,856,395 B2
(45) Date of Patent: Jan. 2, 2018

(54) COATING COMPOSITION, METHOD FOR COATING A SUBSTRATE USING THE SAME AND PIPELINE

(71) Applicant: LEE CHANG YUNG CHEMICAL INDUSTRY CORPORATION, Kaohsiung (TW)

(72) Inventors: Yu-Tien Chen, Changhua County (TW); Po-Nien Tsai, Tainan (TW); Ruoh-Huey Uang, Hsinchu County (TW)

(73) Assignee: LCY CHEMICAL CORP., Kaohsiung (TW)

( * ) Notice: Subject to any disclaimer, the term of this patent is extended or adjusted under 35 U.S.C. 154(b) by 132 days.

(21) Appl. No.: 14/927,570

(22) Filed: Oct. 30, 2015

(65) Prior Publication Data
US 2017/0121556 A1    May 4, 2017

(51) Int. Cl.
| | |
|---|---|
| *B29C 47/00* | (2006.01) |
| *C08F 283/06* | (2006.01) |
| *C08G 65/32* | (2006.01) |
| *C09D 163/00* | (2006.01) |
| *C09D 151/00* | (2006.01) |
| *F16L 58/04* | (2006.01) |

(52) U.S. Cl.
CPC ....... *C09D 163/00* (2013.01); *C09D 151/003* (2013.01); *C09D 151/006* (2013.01); *F16L 58/04* (2013.01)

(58) Field of Classification Search
CPC ... C09D 153/00; C09D 151/003; F16L 57/02; F16L 58/1072
USPC ................ 428/36.9; 525/404, 407
See application file for complete search history.

(56) References Cited

U.S. PATENT DOCUMENTS

| | | | |
|---|---|---|---|
| 3,025,263 A | 3/1962 | Lee, Jr. et al. | |
| 3,960,980 A | 6/1976 | Yukuta et al. | |
| 4,532,299 A * | 7/1985 | Seneker | C08C 19/38 525/112 |
| 5,057,552 A | 10/1991 | Cavitt et al. | |

(Continued)

FOREIGN PATENT DOCUMENTS

| | | | |
|---|---|---|---|
| CN | 101903696 A | | 12/2010 |
| EP | 0 292 251 | * | 5/1988 |

(Continued)

OTHER PUBLICATIONS

E. Passaglia et al., "Grafting of diethyl maleate and maleic anhydride onto styrene-b-(ethylene-co-1-butene)-b-styrene triblock copolymer (SEBS)", Polymer, vol. 41, Issue 12, Jun. 2000, pp. 4389-4400.

*Primary Examiner* — William Cheung
(74) *Attorney, Agent, or Firm* — Bacon & Thomas, PLLC

(57) ABSTRACT

A coating composition, a method for coating a substrate and a pipeline are provided. The coating composition includes at least one epoxy resin and at least one functionalized elastomer. The functionalized elastomer includes an elastomer being grafted with acid anhydride-based groups. The method includes steps of applying the coating composition to the substrate, and curing the coating composition so as to obtain a coating. The pipeline includes a pipe and the coating formed from the coating composition coated on the pipe. The coating has improved flexibility, and improved heat and chemical resistance.

25 Claims, 1 Drawing Sheet

(56) References Cited

U.S. PATENT DOCUMENTS

| | | | |
|---|---|---|---|
| 6,121,386 A | 9/2000 | Ohtsuka et al. | |
| 6,235,361 B1 | 5/2001 | Jacquemet et al. | |
| 6,309,502 B1 | 10/2001 | Hiroshige et al. | |
| 8,714,206 B2 | 5/2014 | Jackson et al. | |
| 2008/0108739 A1* | 5/2008 | Valette | B32B 27/04 524/405 |

FOREIGN PATENT DOCUMENTS

| | | |
|---|---|---|
| EP | 0292251 A2 | 11/1988 |
| TW | 200417464 A | 9/2004 |
| TW | 201127907 A | 8/2011 |
| WO | WO2006090715 A1 | 8/2006 |

* cited by examiner

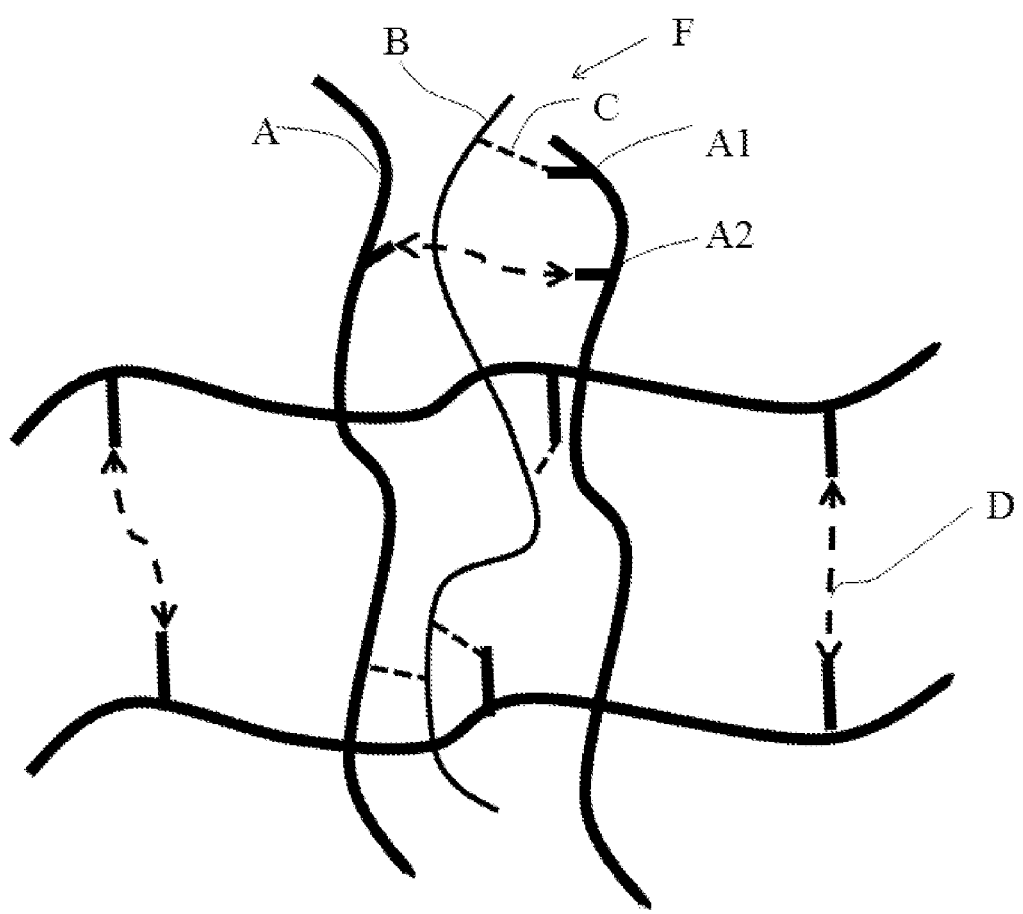

US 9,856,395 B2

COATING COMPOSITION, METHOD FOR COATING A SUBSTRATE USING THE SAME AND PIPELINE

BACKGROUND OF THE INVENTION

1. Field of the Invention

The disclosure relates to coating materials, and in particular, to pipeline coating materials.

2. Description of Related Art

Nowadays, Epoxy resin is commonly used in many applications. For instance, it is used for coating pipelines in the chemical industry. However, since cured epoxy resin generally lacks flexibility, it is hard, brittle, and has low impact resistance. As a result, epoxy resin coatings coated on pipelines crack easily due to thermal shock.

Therefore, there is a need to improve epoxy resin-based coating materials, so as to extend the lifespan of the epoxy resin-based coating material. Particularly, there is a need to improve epoxy resin-based coating materials for use in coating pipelines.

SUMMARY OF THE INVENTION

One aspect of the present disclosure is to provide a coating composition with improved flexibility, and improved heat and chemical resistance, after curing.

Another aspect of the present disclosure is to provide a method for coating a substrate with a coating composition that exhibits improved flexibility, and improved heat and chemical resistance, to thereby alleviate residual internal stress caused by heating and cooling processes.

Still another aspect of the present disclosure is to provide a pipeline coated with the coating composition, to thereby protect the pipeline from corrosion.

The coating composition includes at least one epoxy resin (A), and at least one functionalized elastomer (F). The functionalized elastomer (F) includes an elastomer (B) which is grafted with acid anhydride-based groups (C).

The acid anhydride-based groups (C) improve the polarity of the functionalized elastomer (F), and are able to react with the active sites of the epoxy resin (A), such as epoxide groups. In this way, the compatibility between the epoxy resin (A) and the functionalized elastomer (F) can be improved. Therefore, the risk of separation between the epoxy resin and the functionalized elastomer, because of differences in polarity, can be reduced. In other words, not only can the flexibility of the epoxy resin (A) be increased, but the compatibility between the epoxy resin (A) and the functionalized elastomer (F) can also be improved.

In some embodiments, because of increased compatibility between the epoxy resin and the functionalized elastomer, there is no need to include additional compatibilizers or surfactants into the coating composition.

A method for coating a substrate includes, in some embodiments, the steps of applying the coating composition to the substrate; and curing the coating composition at a predetermined temperature so as to form a coating.

The pipeline includes a pipe, which is coated with a coating composition as described herein.

The above and other aspects of the disclosure will become better understood with regard to the following detailed description and examples, with references made to the accompanying drawings, which are not intended to limit the present invention in any manner.

BRIEF DESCRIPTION OF THE DRAWINGS

The FIGURE is an illustration view of an embodiment of the coating composition.

DETAILED DESCRIPTION OF THE PREFERRED EMBODIMENT

The following description is made for the purpose of illustrating the general principles of the invention and should not be taken in a limiting sense.

A coating composition is provided, and can be used in different kinds of applications. For instance, the coating composition can be coated on a pipe to form a coating to prevent corrosion under insulation (CUI). It can also be used as a coating for other surfaces subject to heat stress, such as roads or driveways.

The FIGURE depicts an illustration of an exemplary coating composition. In some embodiments, the coating composition includes at least one epoxy resin (A), and at least one functionalized elastomer (F). The functionalized elastomer (F) includes an elastomer (B) which is grafted with acid anhydride-based groups (C). The elastomer (B) may be regarded as a backbone of the functionalized elastomer (F). Additionally, in some embodiments, the coating composition may consist of, or consist essentially of, the epoxy resin (A) and the functionalized elastomer (F).

Various epoxy resins (A) may be used in the invention, and may be used singly or in combination. For example, one type of epoxy resin is formed by reacting epichlorohydrin with bisphenol A, to form diglycidyl ethers of bisphenol A (so-called "Bisphenol A epoxy resin"). Other types of epoxy resin can also be used, such as Bisphenol F epoxy resin, Bisphenol S epoxy resin, Novolac epoxy resin, aliphatic epoxy resins such as glycidyl epoxy resins and cycloaliphatic epoxides, and Glycidylamine epoxy resin.

In some embodiments, the elastomer (B) comprises a plurality of hard section units (H) and soft section units (S). In other embodiments, the elastomer consists of, or consists essentially of, a plurality of hard section units (H) and soft section units (S).

The hard section unit (H) of the elastomer (B) is defined as a unit derived from a monomer with a benzene ring or a nitrile group, such as a Styrene-derived unit or an Acrylonitrile-derived unit. The soft section unit (S) of the elastomer (B) is defined as a unit derived from a monomer without a benzene ring or a nitrile group, such as an Ethylene-derived unit, a Butadiene-derived unit, or an Isoprene-derived unit.

For example, the elastomer (B) can be at least one selected from the group consisting of Styrene-Ethylene-Butadiene-Styrene (SEBS) copolymer, Styrene-Butadiene-Styrene (SBS) copolymer, Butadiene-Acrylonitrile Rubber (NBR), Styrene-Isoprene-Styrene (SIS) copolymer, and Carboxyl Terminated Butadiene-Acrylonitrile copolymer (CTBN). The Styrene-derived units and the Acrylonitrile-derived units of the copolymer are exemplary hard section units, and the Ethylene-derived units, the Butadiene-derived units and the Isoprene-derived units of the copolymer are exemplary soft section units.

The weight ratio (parts by weight) of the hard section units to the soft section units can be adjusted according to need, and can be within a range of 10:90 to 90:10, 13:87 to 87:13, 20:80 to 80:20, 30:70 to 70:30, 40:60 to 60:40, 50:50, or 13:87 to 31:69. For example, the weight ratio (parts by weight) of the hard section units to the soft section units can be about 10:90, about 13:87, about 20:80, about 30:70, about 40:60, about 50:50, about 60:40, about 69:31, about 70:30, about 80:20, or about 90:10. To increase the flexibility of the elastomer (B), the soft section units may be increased.

The elastomer (B) is grafted with a plurality of acid anhydride-based groups (C) so as to form the functionalized elastomer (F). Any active sites on the elastomer (B) can be grafted with the acid anhydride-based groups (C), such as, but not limited to, the double bond sites of the elastomer (B). In some embodiments, as exemplified in FIG. 1, the acid anhydride-based groups (C) are grafted at the side of the elastomer (B) as side chain groups. For example, the acid anhydride-based groups (C) are able to graft at the double bond sites of the Butadiene-derived units of elastomer (B), such as SBS copolymer, SEBS copolymer, NBR, CTBN. As another example, the acid anhydride-based groups (C) are able to graft at the double bond sites of the Isoprene-derived units of the elastomer (B), such as SIS.

The grafting ratio of the acid anhydride-based groups (C) to the functionalized elastomer (F) can be in a range of 0.5:100 to 20:100, 1:100 to 10:100, 2:100 to 8:100, 3:100 to 7:100, 4:100 to 6:100, or 1.5:100 to 3:100. The grafting ratio is the ratio of the weight (part by weight) of the acid anhydride-based groups (C) to the weight (part by weight) of the functionalized elastomer (F). The grafting ratio can be, for example, about 1.5:100, about 2:100, about 3:100, about 4:100, about 5:100, about 6:100, about 7:100, about 8:100, about 9:100, or about 10:100.

In some embodiments, the acid anhydride-based groups are grafted at the side of the elastomer (B) as side chain groups; this may provide an increase in the number of reaction sites available to react with active sites (A1) on the epoxy resin (A), such as epoxide groups, as compared to grafting just at the end of the elastomer as end groups. In general, the more acid anhydride-based groups that are able to be grafted, the greater the polarity of the elastomer will be. As a result, compatibility between the epoxy resin (A) and the functionalized elastomer (F) can be increased. In other words, phase separation between the functionalized elastomer (F) blended with the epoxy resin (A) can be prevented.

The acid anhydride-based groups (C) can be at least one selected from an aromatic-anhydride based group, an alicyclic-anhydride based group, or an aliphatic-anhydride based group. For example, the acid anhydride-based groups (C) can be a maleic anhydride-based group, a methyltetrahydrophthalic anhydride-based group, a tetrahydro phthalic anhydride-based group, a methylnadic anhydride-based group or a combination thereof.

In certain embodiments, the acid anhydride-based groups (C) are maleic anhydride functional groups. The structure of maleic anhydride functional groups is less complex than other acid anhydride-based groups, and consequently, the steric effect thereof may be less than that of other acid anhydride-based groups.

The following chemical formula [I] is an example of the functionalized elastomer (F).

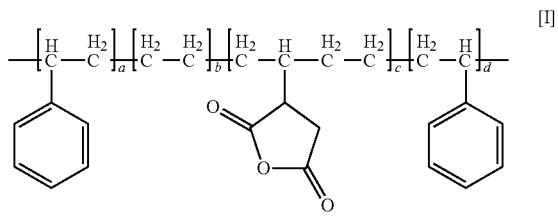

Chemical formula [I] shows S(E)BS-grafted-MA functional groups, wherein, "a" and "d" represent the weight of styrene-derived units, and the weight of a and d is from 10 to 90 (part by weight). "b" represents the weight of ethylene-derived units, which is from 0 to 80 (part by weight). "c" represents the weight of butadiene-derived units grafted with the maleic anhydride functional group, which is from 10 to 90 (part by weight). The total of a, b, c, and d is equal to 100 (part by weight).

The functionalized elastomer (F) can be prepared in several ways, such as that disclosed in "Grafting of diethyl maleate and maleic anhydride onto styrene-b-(ethylene-co-1-butene)-b-styrene triblock copolymer (SEBS)" (E. Passaglia et al, Polymer 41 (2000) 4389-4400), which is herein incorporated by reference. In some embodiments, the functionalized elastomer (F) can also be prepared by free radical polymerization with a peroxide compound.

In some embodiments, the weight ratio (parts by weight) of the epoxy resin (A) to the functionalized elastomer (F) can be in a range of 1:0.05 to 1:2, 1:0.05 to 1:1, 1:0.5 to 1:2, or 1:10 to 1:20. The composition may or may not include a curing agent and a catalyst. For example, the weight ratio (parts by weight) of the epoxy resin (A) to the functionalized elastomer (F) can be about 1:0.05, about 1:0.1, about 1:0.2, about 1:0.3, about 1:0.4, about 1:0.5, about 1:0.6, about 1:0.7, about 1:0.8, about 1:0.9, about 1:1, about 1:2, about 1:10, or 1:20.

By blending the functionalized elastomer (F) with the epoxy resin (A), parts of the acid anhydride based groups (C) of the functionalized elastomer (F) react with the active sites (A1) of the epoxy resin (A). Consequently, the flexibility of the epoxy resin (A) after curing can be increased so as to alleviate residual internal stress. In turn, the impact resistance, and the bending strength of the coating composition, after curing, can be increased. In addition, the heat resistance of the coating composition after curing can be increased. In this way, the coating composition of the present invention can be used in, for example, pipeline coatings, CUI equipment coatings, etc.

Since the compatibility of the epoxy resin (A) and the functionalized elastomer (F) are highly improved in some embodiments, there is no need to add additional compatibilizer or surfactant into the coating composition in order to prevent phase separation between the epoxy resin (A) and the functionalized elastomer (F), and maintain stability of the coating composition.

As shown in FIG. 1, in some embodiments, the coating composition may further comprise a curing agent (D). The curing agent is able to crosslink with active sites (A2) of the epoxy resin (A). The weight ratio (parts by weight) of the epoxy resin (A) to the curing agent (D) can be in a range of, for example, 1:0.01 to 1:0.8, 1:0.1 to 1:0.5, or 1:0.1 to 1:0.2. In some embodiments, the weight ratio (parts by weight) of the epoxy resin (A) to the curing agent (D) may be about 1:0.1, about 1:0.15, about 1:0.2, about 1:0.3, about 1:0.4, about 1:0.5, about 1:0.6, about 1:0.7, or about 1:0.8.

In some embodiments, there is no need to add a curing agent but the coating composition still works without exhibiting phase separation, and exhibits improved flexibility, and improved heat and chemical resistance, after curing when the weight ratio of epoxy resin (A) to the functionalized elastomer (F) is in a range of 1:10 to 1:25. If the amount of the functionalized elastomer (F) is too high, some properties such as solvent resistance of the coating composition may be decreased.

In some embodiments, the curing agent may be imidazole, polymercaptan, or anhydride. For example, the curing agent may be at least one anhydride selected from the group consisting of aromatic anhydride, alicyclic anhydride, and aliphatic anhydride, such as Pyromellitic Dianhydride (PDMA).

In some embodiments, the coating composition may further include a catalyst (E) (not shown in FIG. 1) for catalyzing the curing reaction, and the weight ratio (parts by weight) of the epoxy resin (A) to the catalyst (E) can be in a range of 1:0.001 to 1:0.05. For example, the weight ratio (parts by weight) of the epoxy resin (A) to the catalyst (E) can be 1:0.001, 1:0.005, 1:0.01, 1:0.02, 1:0.03, 1:0.04, or 1:0.05.

The catalyst (E) can be at least one selected from the group consisting of a boric-acid ester, a Lewis acid, an organic metal compound, an organic metal salt and imidazole. For example, the catalyst (E) can be an organic tin compound, an organic zinc compound, an organic nickel compound, an organic cobalt compound, an organic chromium compound, an organic copper compound, or a combination thereof. For example, the organic metal compound can be tin (II) 2-ethylhexanoate, tin isopropoxide, tin oxalate, zinc 2,4-pentane dionate, zinc acetate, zinc oxalate, dibutyltin diacetate, dibutyltin dilaurate, dioctyltin diacetate, zinc naphthenate, zinc carboxylate, nickel carboxylate, or a combination thereof.

In another aspect of the present disclosure, a method for coating a substrate is provided. In these embodiments, the steps may include applying the coating composition to a substrate; and curing the coating composition at a predetermined temperature so as to form a coating. The predetermined temperature can be 100° C. to 150° C., such as about 120° C., and the curing time can be less than 40 minutes. The substrate can be a portion of a pipe, and may be the inside or the outside of the pipe.

In another aspect of the present disclosure, a pipeline for chemical industry is provided. In some embodiments, the pipeline includes a pipe coated with the coating.

Since the flexibility, the heat resistance, and the impact resistance of the coating of the disclosure are improved, the coating coated on the pipeline (either the inner surface and/or the outer surface of the pipe can be coated) is able to protect the pipeline from corrosion. In addition, since the flexibility of the coating is increased to alleviate residual internal stress during heating and cooling, the lifespan of the coating can be extended.

Below, experimental examples will be described in detail so as to be easily realized by a person having ordinary skill in the art. The inventive concept may be embodied in various forms without being limited to the exemplary experiment results set forth herein. Descriptions of well-known parts are omitted for clarity, and like reference numerals refer to like elements throughout.

EXPERIMENTAL EXAMPLES

Solution Preparation 10 wt % PMDA (Pyromellitic dianhydride, available from Alfa Aesar) solution, 10 wt % Organic Tin (Tin(II) 2-ethylhexanoate, available from Alfa Aesar) solution, were prepared respectively by using THF (Tetrahydrofuran, available from Merck) as a solvent.

Also, 5 wt % of several types of elastomer or functionalized elastomer solution were prepared respectively by using THF (Tetrahydrofuran, available from Merck) as a solvent. Table 1 below depicts the prepared Type I to IV SEBS solution, wherein the solute of type I and II SEBS solution are functionalized elastomer, which are SEBS grafted with maleic anhydride functional groups (SEBS-gf-MA) with different weight ratio of the hard section units to soft section units, and the solute of type III and IV SEBS solution are SEBS without being grafted with acid anhydride-based groups with different weight ratio of the hard section units to soft section units.

TABLE 1

| Solution TYPE | solute | Hard section unit:soft section unit * | Manufacture |
|---|---|---|---|
| TYPE I | SEBS-gf-MA 9901 | 31:69 | LCY Corp. |
| TYPE II | SEBS-gf-MA 9924 | 13:87 | LCY Corp. |
| TYPE III | SEBS-9552 | 30:70 | LCY Corp. |
| TYPE IV | SEBS-9557 | 13:87 | LCY Corp. |

* weight ratio

Sample Preparation

Example 1 (E1 Sample)

100 g of epoxy resin (diglycidyl ether of bisphenol A, DER 383, available from Dow Chemical Company), 200 g of 10 wt % PMDA solution, 5 g of 10 wt % Organic Tin solution, and 100 g of 5 wt % TYPE I SEBS solution were mixed in a reaction bottle so as to obtain the E1 sample, which represents a coating composition. The E1 sample contains epoxy resin (A), SEBS-gf-MA 9901 as the functionalized elastomer (F), PDMA as a curing agent (D), and organic tin as a catalyst (E); the weight ratio of epoxy resin (A):functionalized elastomer (F):curing agent (D):catalyst (E) is 1:0.05:0.2:0.005. After the E1 sample was mixed to uniformity, the E1 sample was coated on a substrate, and then the substrate coated with the E1 sample was placed in an oven for baking at 120° C. for 40 minutes, so as to obtain a coating coated on the substrate. The substrate is made of metal, such as stainless steel, carbon steel, or aluminum.

Example 2 (E2 Sample)

100 g of epoxy resin (diglycidyl ether of bisphenol A, DER 383, available from Dow Chemical Company), 200 g of 10 wt % PMDA solution, 5 g of 10 wt % Organic Tin solution, and 100 g of 5 wt % TYPE II SEBS solution were mixed in a reaction bottle so as to obtain the E2 sample, which represents another coating composition. The E2 sample contains epoxy resin (A), SEBS-gf-MA 9924 as a functionalized elastomer (F), PDMA as a curing agent (D), and organic tin as a catalyst (E); the weight ratio of epoxy resin (A):functionalized elastomer (F):curing agent (D):catalyst (E) is 1:0.05:0.2:0.005. After the E2 sample was mixed to uniformity, the E2 sample was coated on a substrate, and then the substrate coated with the E2 sample was placed in an oven for baking at 120° C. for 40 minutes, so as to obtain a coating coated on the substrate.

Comparative Example 1 (CE1 Sample)

100 g of epoxy resin (diglycidyl ether of bisphenol A, DER 383, available from Dow Chemical Company), 200 g of 10 wt % PMDA solution, and 5 g of 10 wt % organic tin solution were mixed in a reaction bottle so as to obtain the CE1 sample, which represents a conventional coating composition without elastomer. The CE1 sample contains Epoxy resin (A), PDMA as a curing agent (D), and organic tin as a catalyst (E); the weight ratio (part by weight) of Epoxy resin (A):curing agent (D):catalyst (E) is 1:0.2:0.005.

After the CE1 sample was mixed to uniformity, the CE1 sample was coated on a substrate, and then the substrate coated with the CE1 sample was placed in an oven for baking at 120° C. for 30 minutes, so as to obtain a conventional coating coated on the substrate.

Comparative Example 2 (CE2 Sample)

100 g of epoxy resin (diglycidyl ether of bisphenol A, DER 383, available from Dow Chemical Company), 200 g of 10 wt % PMDA solution, 5 g of 10 wt % organic tin solution, and 100 g of 5 wt % TYPE III SEBS solution were mixed in a reaction bottle so as to obtain the CE2 sample, which represents a coating composition containing a non-functionalized elastomer. The CE2 sample contains epoxy resin (A), SEBS-9552 as a non-functionalized elastomer (N), PDMA as a curing agent (D), and organic tin as a catalyst (E); the weight ratio of epoxy resin (A):functionalized elastomer (N):curing agent (D):catalyst (E) is 1:0.05:0.2:0.005. After the CE2 sample was mixed, the CE2 sample was coated on a substrate, and then the substrate coated with the CE2 sample was placed in an oven for baking at 120° C. for 40 minutes.

Comparative Example 3 (CE3 Sample)

100 g of epoxy resin (diglycidyl ether of bisphenol A, DER 383, available from Dow Chemical Company), 200 g of 10 wt % PMDA solution, 5 g of 10 wt % organic tin solution, and 100 g of 5 wt % TYPE IV SEBS solution were mixed in a reaction bottle so as to obtain the CE3 sample, which represents another coating composition containing a non-functionalized elastomer. The CE3 sample contains epoxy resin (A), SEBS-9557 as a non-functionalized elastomer (N), PDMA as a curing agent (D), and organic tin as a catalyst (E); the weight ratio of epoxy resin (A):functionalized elastomer (N):curing agent (D):catalyst (E) is 1:0.05:0.2:0.005. After the CE3 sample was mixed, the CE3 sample was coated on a substrate, and then the substrate coated with the CE3 sample was placed in an oven for baking at 120° C. for 40 minutes.

A Bend test (cylinder mandrel), performed in accordance with ISO 1519, and a Chemical Resistance test, performed in accordance with ASTM D1308, were conducted on the substrates coated with different coatings formed from these samples.

In brief, the Bend test in accordance with ISO 1519 is used to determine the elasticity adhesion and elongation of paint, or of a coating, on sheet metal. A test panel (max. size 150×100 mm), which is the substrate in the experiment, is bent over a cylindrical mandrel. The smaller the diameter of the mandrel, the larger the tension on the coating. The test panel is then checked for cracks or damage in the coating. The Chemical Resistance test includes a gasoline resistance test, an acid resistance test, a base resistance test, and an alkali resistance test.

Table 2 below shows the test results of the prepared samples.

TABLE 2

| | The weight ratio among the coating composition | | | | | | Test Results | |
|---|---|---|---|---|---|---|---|---|
| Sample | Epoxy resin | Elastomer | Functionalized Elastomer | Curing agent | Catalyst | Curing condition | Bend test* | Chemical Resistance** |
| E1 | 1 | — | 0.05 | 0.2 | 0.005 | 120° C. 40 min | 5 mm (min) | Pass |
| E2 | 1 | — | 0.05 | 0.2 | 0.005 | 120° C. 40 min | <2 mm (min) | Pass |
| CE1 | 1 | — | — | 0.2 | 0.005 | 120° C. 30 min | 16 mm (min) | pass |
| CE2 | 1 | 0.05 | — | 0.2 | 0.005 | 120° C. 40 min | Phases separate out. The coating cannot work. | |
| CE3 | 1 | 0.05 | — | 0.2 | 0.005 | 120° C. 40 min | Phases separate out. The coating cannot work. | |

*Bend test by ISO 1519;
**Chemical Resistance test ASTM D1308 including gasoline resistance, acid resistance, base resistance, and alkali resistance tests Referring to the CE1 sample, which represents a conventional epoxy resin coating composition without adding any type of elastomer, although the substrate coated with the coating formed from CE1 sample passed the gasoline resistance test, the acid resistance test, the base resistance test and the alkali resistance test, the diameter of mandrel of the bend test result is about 16 mm (min).

In contrast, referring to the test results of the E1 sample, the substrate coated with the coating formed from the E1 sample, it not only passed the gasoline resistance test, the acid resistance test, the base resistance test, and the alkali resistance test, but the bend test result also shows that the diameter of the mandrel is about 5 mm (min). In other words, the flexibility of the coating formed from the E1 sample, which represents an embodiment of the coating composition of the present invention, is significantly increased in comparison to CE1.

In addition, referring to the test result of the E2 sample, the substrate coated with the coating formed from the E2 sample, not only passed the gasoline resistance test, the acid resistance test, the base resistance test, and the alkali resistance test, but also the bend test result shows that the diameter of the mandrel is less than 2 mm (min). In other words, the flexibility of the coating formed from the E2 sample, which represents another embodiment of the coating composition of the present invention, is significantly increased in comparison to CE1.

Furthermore, by comparing the results of the E1 and E2 samples, the diameter of the mandrel of the E2 sample having SEBS-gf-MA, with the weight ratio of the hard section unit to the soft section unit being 13:87, is less than that of the E1 sample with SEBS-gf-MA, with the weight ratio of the hard section unit to the soft section unit being 31:69. Accordingly, the weight ratio of the hard section unit to the soft section unit within the functionalized elastomer (F) can be manipulated to modify the flexibility of the coating formed from the coating composition. The more soft section units that are included, the more flexibility can be achieved.

Referring to the E1 sample and the CE2 sample, the E1 sample exhibits no phase separation, and has improved flexibility and chemical resistance. In contrast, the CE2 sample, a coating composition containing a non-functionalized elastomer, is unsatisfactory due to phase separation. Also, referring to the E2 sample and the CE3 sample, the E2 sample exhibits no phase separation, and exhibits improved flexibility and chemical resistance. In contrast, the CE3 sample, a coating composition containing another non-functionalized elastomer, is unsatisfactory due to phase separation.

In other words, the compatibility of the coating composition of the present examples is significantly increased, and there is no need to add additional compatibilizers or surfactants into the mixture to prevent phase separation.

Several tested compositions of the invention are further provided in the following Table 3. The sample preparation method was similar to that described above. Different samples with different weight ratios were prepared, and the mixed solution of each sample was coated on a substrate, and then put into an oven for baking at 120° C. for 40 minutes. The substrate is made of metal as described above. Also, the bend test and the chemical resistant test method are as described above.

TABLE 3

| Sample | Epoxy resin (A) (DER 383) | Functionalized elastomer (F) (SEBS-gf-MA 9924/THF = 5 wt %) | Curing Agent (D) (PMDA/ THF = 10 wt %) | Catalyst (E) (Sn2+/ THF = 10 wt %) | Result |
|---|---|---|---|---|---|
| E3 | 100 phr | 30 phr | 20 phr | 0.5 phr | OK |
| E4 | 100 phr | 50 phr | 20 phr | 0.5 phr | OK |
| E5 | 100 phr | 100 phr | 20 phr | 0.5 phr | OK |
| E6 | 100 phr | 50 phr | 10 phr | 0.5 phr | OK |
| E7 | 100 phr | 100 phr | 10 phr | 0.5 phr | OK |
| E8 | 100 phr | 150 phr | 10 phr | 0.5 phr | OK |
| E9 | 100 phr | 200 phr | 10 phr | 0.5 phr | OK |
| E10 | 100 phr | 2000 phr | 0 | 0.5 phr | OK |

OK: the coating composition after curing can be film without phase separation issue, the bend test result is almost less than 2 mm (min) in accordance with ISO1519, and pass the chemical resistance test in accordance with ASTM D1308.
phr: parts per hundreds of resin Table 3 shows that the weight ratio of Epoxy resin (A):Functionalized elastomer (F):Curing Agent (D):Catalyst (E) can be 1:0.3~1:0.2:0.005, 1:0.5~2:0.1:0.005, or 1:20:0: 0.005. In brief, according to the embodiments of the present invention, the weight ratio of Epoxy resin (A):Functionalized elastomer (F):Curing Agent (D):Catalyst (E) can be 1:0.05~2:0.1~0.2:0.001~0.05, or 1:10~25:0:0.001~0.05.

All of the above tested examples can be cured without phase separation, so as to form a coating. In some examples, the bend test result is about 5 mm (min), in other examples, the bend test result is less than 2 mm (min), and all of the examples can pass the chemical resistance test, including the gasoline resistance test, the acid resistance test, and the alkali resistance test.

Although some embodiments of the present disclosure and their advantages have been described in detail, it should be understood that various changes, substitutions and alterations can be made herein without departing from the spirit and scope of the disclosure as defined herein. For example, it will be readily understood by those skilled in the art that many of the features, functions, processes, and materials described herein may be varied while remaining within the scope of the present disclosure.

Moreover, the scope of the present application is not intended to be limited to the particular embodiments of the process, machine, manufacture, and compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A coating composition consisting of:
at least one epoxy resin (A);
at least one functionalized elastomer (F) including an elastomer (B) being grafted with acid anhydride-based groups (C), wherein the elastomer (B) comprises a plurality of hard section units (H) and a plurality of soft section units (S),
wherein the hard section units (H) of the elastomer (B) have a unit derived from a monomer with a benzene ring or a nitrile group, the soft section units (S) of the elastomer (B) have a unit derived from a monomer without a benzene ring or a nitrile group,
wherein the acid anhydride-based groups (C) are grafted at a side of the elastomer (B) as side chain groups;
a curing agent (D); and
optionally a catalyst (E).

2. The coating composition of claim 1, wherein the grafting ratio of the acid anhydride-based groups (C) to the functionalized elastomer (F) is in a range of 0.5:100 to 20:100.

3. The coating composition of claim 2, wherein the grafting ratio of the acid anhydride-based groups (C) to the functionalized elastomer (F) is in a range of 1.5:100 to 3:100.

4. The coating composition of claim 1, wherein the weight ratio (parts by weight) of the hard section units to the soft section units is in a range of 10:90 to 90:10.

5. The coating composition of claim 4, wherein the weight ratio (parts by weight) of the hard section units to the soft section units is in a range of 10:90 to 40:60.

6. The coating composition of claim 4, wherein the elastomer (B) is at least one selected from the group consisting of Styrene-Ethylene-Butadiene-Styrene (SEBS) copolymer, Styrene-Butadiene-Styrene (SBS) copolymer, Butadiene-Acrylonitrile Rubber (NBR), Styrene-Isoprene-Styrene (SIS) copolymer, and Carboxyl Terminated Butadiene-Acrylonitrile copolymer (CTBN); wherein the Styrene derived units and the Acrylonitrile derived units are respectively defined as the hard section units, the Ethylene derived units, the Butadiene derived units and the Isoprene derived units are respectively defined as the soft section units.

7. The coating composition of claim 1, wherein the acid anhydride-based groups (C) are at least one selected from the group consisting of aromatic-anhydride based group, alicyclic-anhydride based group, or aliphatic-anhydride based group.

8. The coating composition of claim 1, wherein the acid anhydride-based groups (C) are maleic anhydride functional groups.

9. The coating composition of claim 1, wherein the weight ratio (parts by weight) of the epoxy resin (A) to the functionalized elastomer (F) is in a range of 1:0.05 to 1:20.

10. The coating composition of claim 9, wherein the weight ratio (parts by weight) of the epoxy resin (A) to the functionalized elastomer (F) is in a range of 1:0.05 to 1:1, or 1:0.5 to 1:2.

11. The coating composition of claim 1, wherein the weight ratio (parts by weight) of the epoxy resin (A) to the curing agent (D) is in a range of 1:0.01 to 1:0.8.

12. The coating composition of claim 11, wherein the weight ratio (parts by weight) of the epoxy resin (A) to the curing agent (D) is in a range of 1:0.1 to 1:0.2.

13. The coating composition of claim 1, wherein the curing agent (D) is at least one selected from the group consisting of imidazole, polymercaptan, and anhydride.

14. The coating composition of claim 1, wherein the curing agent (D) is Pyromellitic Dianhydride (PMDA).

15. The coating composition of claim 1, further comprising a catalyst (E), and the weight ratio of the epoxy resin (A) to the catalyst (E) is in a range of 1:0.001~0.05.

16. A coating composition consisting of:
at least one epoxy resin (A);
at least one functionalized elastomer (F) including an elastomer (B) being grafted with acid anhydride-based groups (C), wherein the elastomer (B) comprises a plurality of hard section units (H) and a plurality of soft section units (S),
wherein the hard section units (H) of the elastomer (B) have a unit derived from a monomer with a benzene ring or a nitrile group, the soft section units (S) of the elastomer (B) have a unit derived from a monomer without a benzene ring or a nitrile group,
wherein the acid anhydride-based groups (C) are grafted at a side of the elastomer (B) as side chain groups; and
optionally a catalyst (E),
wherein the coating composition is free of curing agent, and the weight ratio of the epoxy resin (A):the functionalized elastomer (F) is 1:10 to 1:25.

17. The coating composition of claim 16, further comprising a catalyst (E), and the weight ratio of the epoxy resin (A) to the catalyst (E) is in a range of 1:0.001 to 1:0.05.

18. The coating composition of claim 15, wherein the catalyst (E) is at least one selected from the group consisting of boric-acid ester, Lewis acid, organic metal compound, organic metal salt, and imidazole.

19. The coating composition of claim 17, wherein the catalyst (E) is at least one selected from the group consisting of boric-acid ester, Lewis acid, organic metal compound, organic metal salt, and imidazole.

20. The coating composition of claim 1, wherein the epoxy resin (A) is at least one selected from the group consisting of Bisphenol A epoxy resin, Bisphenol F epoxy resin, Bisphenol S epoxy resin, Novolac epoxy resin, aliphatic epoxy resin, and Glycidylamine epoxy resin.

21. A method for coating a substrate comprising the steps of:
applying the coating composition of claim 1 to the substrate; and
curing the coating composition at a predetermined temperature so as to obtain a coating.

22. A pipeline comprising:
a pipe; and
a coating formed from the coating composition of claim 1 coated on the pipe.

23. The coating composition of claim 16, wherein the epoxy resin (A) is at least one selected from the group consisting of Bisphenol A epoxy resin, Bisphenol F epoxy resin, Bisphenol S epoxy resin, Novolac epoxy resin, aliphatic epoxy resin, and Glycidylamine epoxy resin.

24. A method for coating a substrate comprising the steps of:
applying the coating composition of claim 16 to the substrate; and
curing the coating composition at a predetermined temperature so as to obtain a coating.

25. A pipeline comprising:
a pipe; and
a coating formed from the coating composition of claim 16 coated on the pipe.

* * * * *